Patented Aug. 13, 1940

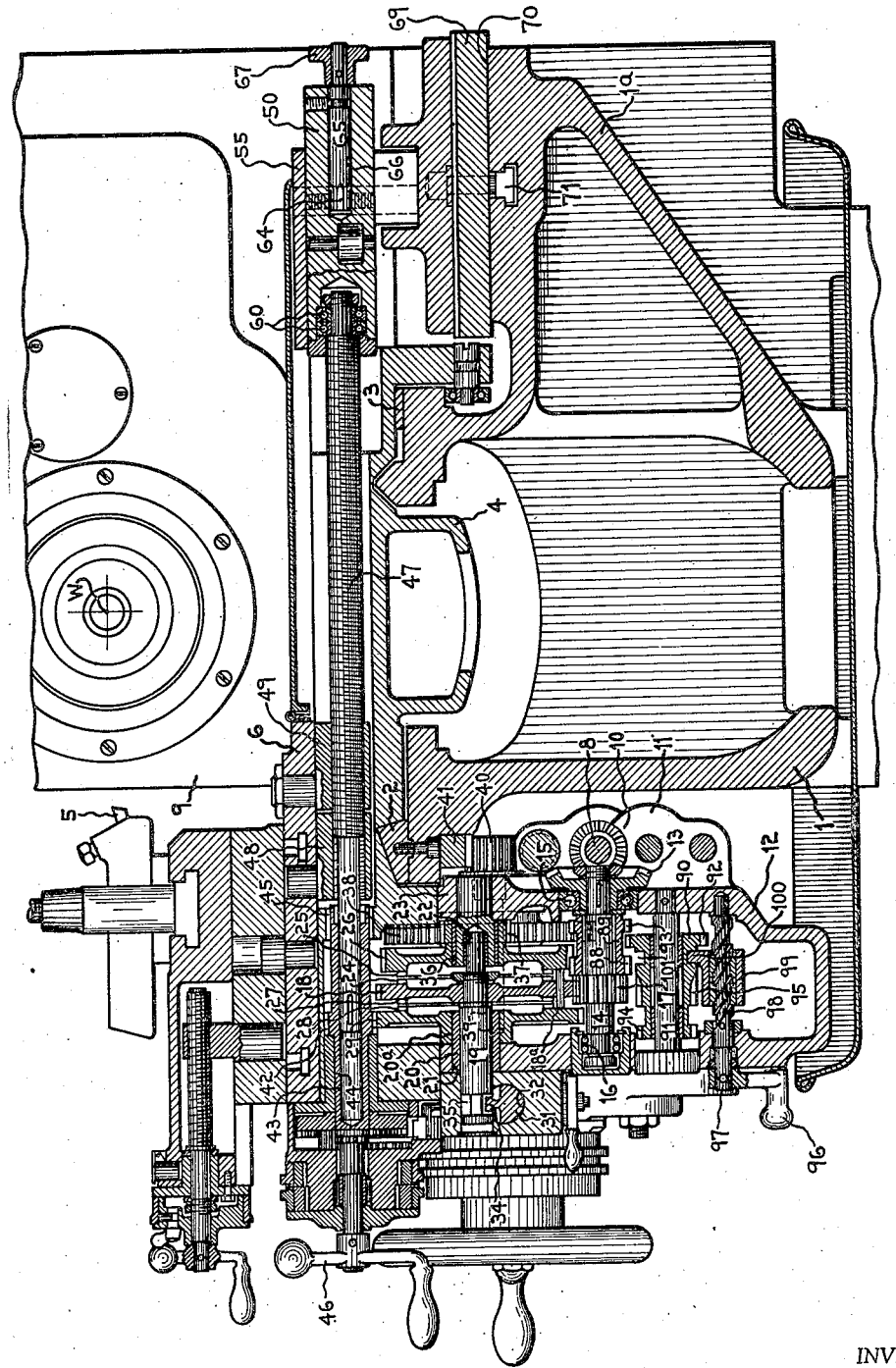

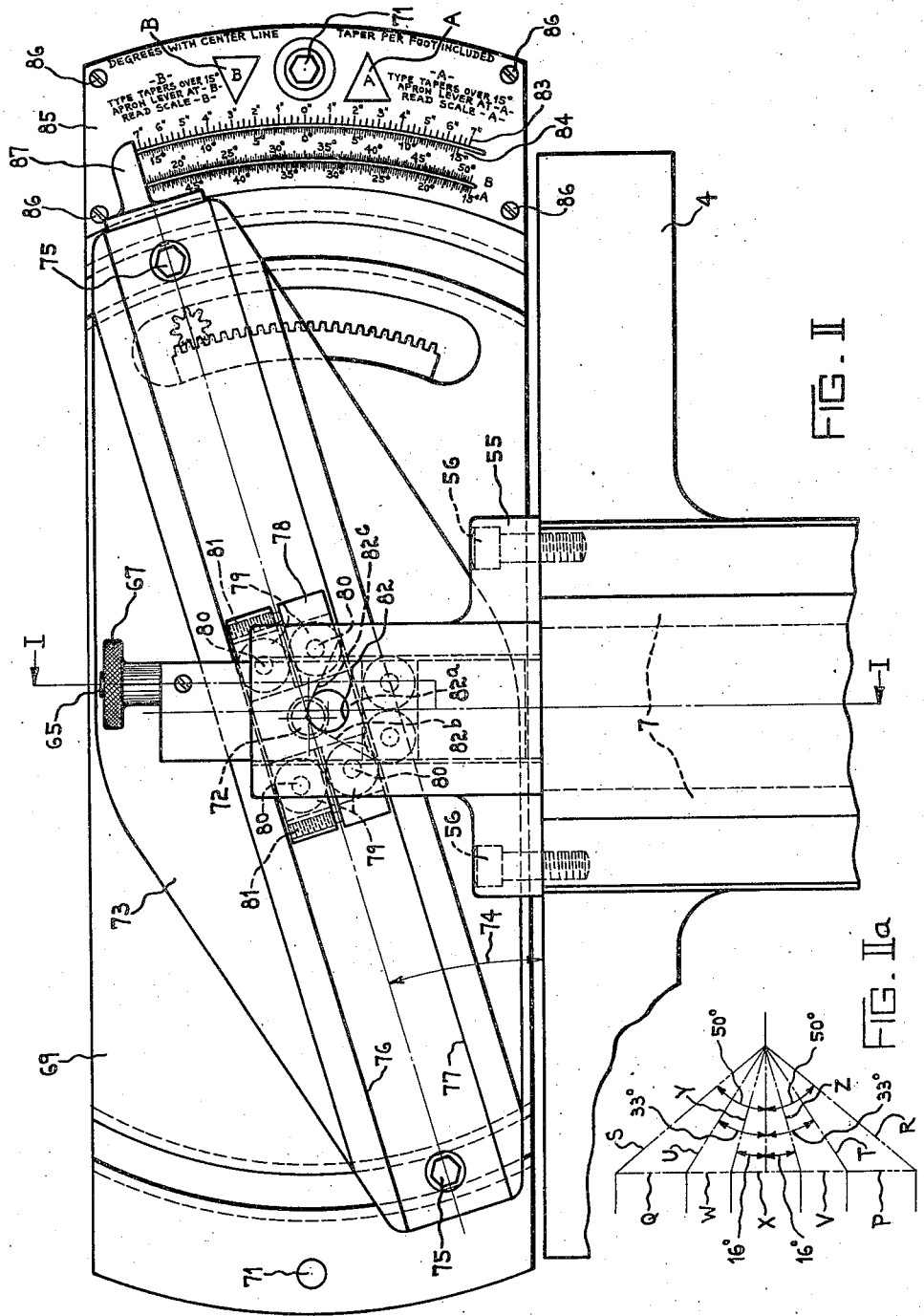

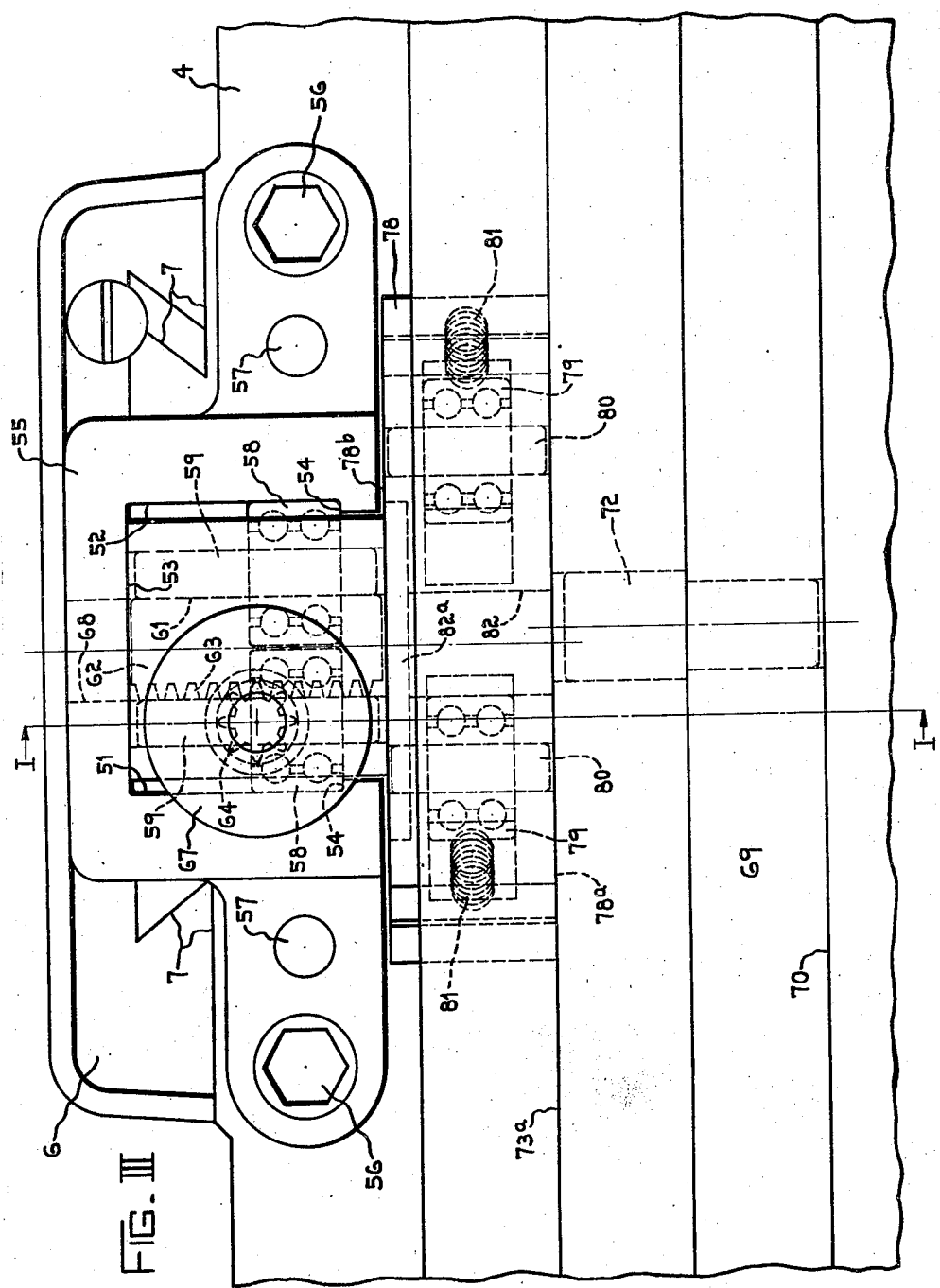

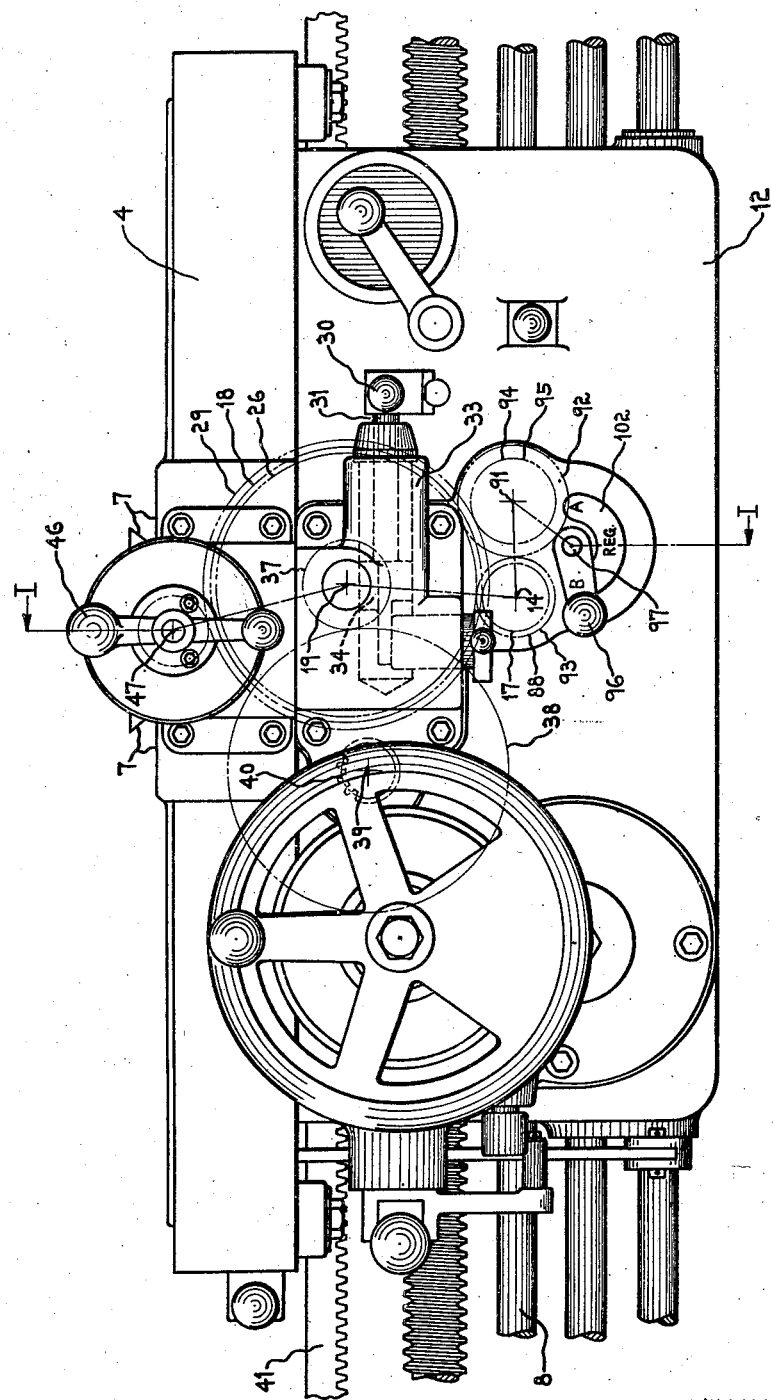
Aug. 13, 1940.   W. F. GROENE ET AL   2,211,723
TAPER TURNING APPARATUS
Filed Sept. 12, 1939   4 Sheets-Sheet 4
FIG. IV
WITNESS.
Orlando S. Knox
INVENTORS.
WILLIAM F. GROENE
HARRY C. KEMPER
BY Willard S. Groene
ATTORNEY.

2,211,723

UNITED STATES PATENT OFFICE 2,211,723

TAPER TURNING APPARATUS

William F. Groene and Harry C. Kemper, Cincinnati, Ohio, assignors to The R. K. LeBlond Machine Tool Company, Cincinnati, Ohio, a corporation of Delaware Application September 12, 1939, Serial No. 294,512

15 Claims. (Cl. 82—17)

This invention pertains to taper turning apparatus for lathes which is particularly adaptable for use with the regular feeding mechanisms of engine and tool room lathes.

One object is to provide a taper turning apparatus in conjunction with the ordinary feeding mechanism of a lathe carriage and apron which may be readily put into or out of operation with a minimum of effort and thought on the part of the operator.

Another object is to provide a taper turning apparatus which utilizes the power feeding apparatus for the carriage and cross slide of the lathe in effecting taper turning operations.

A still further object is to provide means for taper turning in a lathe by the simultaneous operation of the longitudinal feeding of the carriage and the cross feeding of the cross slide.

It is also an object to provide a taper turning apparatus in which tapers may be turned by use of a taper bar which modifies the action of the cross feed screw for the cross slide when the cross feed screw and carriage are being operated simultaneously.

Further features and advantages of this invention will appear in the following detailed description of the drawings in which:

Figure I is a diagrammatic transverse section through a typical engine or tool room lathe embodying the taper turning mechanism of this invention substantially on the line I—I of Figures II, III, and IV.

Figure II is a plan view of the taper form bar on the rear of the lathe carriage which operates in conjunction with the combined cross and longitudinal feed mechanism in the lathe apron.

Figure IIa is a diagram showing the various ranges of the taper attachment.

Figure III is a rear elevation of the taper form bar of Figure II.

Figure IV is a front elevation of the lathe apron incorporating the combined cross and longitudinal feeding mechanism.

The taper turning mechanism is shown applied to a lathe having a bed 1 with ways 2 and 3 upon which is slidably mounted the carriage 4 for effecting longitudinal feeding in the cutting tool 5 of the lathe. On the carriage 4 is slidably mounted the cross slide 6 on appropriate dovetail guideways 7 for effecting cross feeding movements in the tool 5.

Power for actuating the carriage 4 and cross slide 6 is obtained from the usual feed rod 8 which is driven from the transmission of the lathe headstock 9 in a conventional manner. A bevel gear 10 journaled in the integral boss 11 of the apron 12 is slidably keyed about the feed rod 8 and is thereby adapted to be driven by the rod in any position of the carriage 4 along the bed 1. This bevel gear 10 is adapted to drive the bevel gear 13 fixed on the shaft 14 journaled in bearings 15 and 16 in the apron 12. Formed integrally with the shaft 14 is the pinion 17 which is constantly in mesh with and drives the shiftable clutch gear 18 fixed on the shifter shaft 19 which in turn is slidably and rotatably mounted in the bushing 20 fixed in the bore 21 in the front of the apron and in the bushing 22 carried in the stud 23 fixed in the rear of the apron. This shiftable clutch gear 18 has clutch teeth 24 adapted to engage clutch teeth 25 on the longitudinal feed clutch gear 26, when shifted to the right, Figure I and has clutch teeth 27 adapted to engage clutch teeth 28 on the cross feed clutch gear 29, when shifted to the left, Figure I. The gears 26 and 29 are kept properly spaced apart by pins 18a slidingly fitting on the gear 18.

This shiftable clutch gear is moved by means of the longitudinal and cross feed selection handle 30, Figure IV, which is carried on a rock shaft 31 carried in the bore 32 in the bracket 33 fixed on the front of the apron 12. The rock shaft 31 has a single gear tooth 34 which projects into the annular slot 35 formed in the shaft 19 so that when the lever 30 is raised clutch teeth 24 and 25 will be engaged and when the lever is lowered clutch teeth 27 and 28 will be engaged thus effecting driving of either of these gears 26 or 28 from the gear 18.

The longitudinal feed clutch gear 26 is journaled on the bearing portion 36 of the stud 23 and has a hub portion upon which is integrally cut the gear 37 which engages and drives the gear 38 fixed on the rack pinion shaft 39 journaled in the apron. Cut integrally on the shaft 39 is the rack pinion 40 which operates in the rack 41 fixed on the bed 1. Thus when clutch teeth 24 and 25 are engaged power from the feed rod 8 passes through the bevel gears 10 and 13, the pinion 17, gear 18 through these clutch teeth to gear 26 and its integral gear 37, and the gear 38 to rotate the rack pinion 40 to move the carriage 4 in longitudinal feed movement.

The cross feed clutch gear 29 is journaled on the inwardly projecting bearing portion 20a of the bushing 20 and engages the cross feed screw pinion 42. This pinion is formed on the cross feed screw sleeve 43 appropriately journaled in bearings 44 and 45 against axial movement and arranged to be rotated manually by means of the cross feed ball handle 46. The cross feed screw 47 is telescopically mounted in this sleeve and operates in a pair of compensating nuts 48 and 49 carried in the cross slide 6.

Axial movement of the cross feed screw 47 is restricted and controlled by the slide block 50 slidably mounted between the surfaces 51, 52, 53, and 54 in a bracket 55 fixed to the rear of the lathe carriage 4 by suitable screws 56 and dowel pins 57. Appropriate ball bearings 58 are carried on studs 59 in the block contacting the surfaces 51, 52, and 54 to minimize friction during sliding movement of the block. The rear end of the cross feed screw is journaled against any axial movement in appropriate bearings 60 carried in the slide block 50.

The block 50 may be locked in the carriage 4 to prevent relative axial movement of the cross feed screw relative to the carriage. Nicely slidingly fitting in bore 61 in the block 50 is the locking plunger 62 having a rack 63 formed on it which is engaged by a rack pinion 64 formed on the actuating shaft 65 journaled in the bore 66 in the block 50. A control knob 67 is fixed on this shaft 65 so that it may be rotated to slide the plunger 62 in the bore 61. When the knob is rotated counter-clockwise, Figure III, the plunger 62 is raised upwardly and may be entered in a bore 68 provided in the bracket 55 thus locking the block 50 against movement in the bracket. Under these conditions the cross feed screw 47 has no axial movement. When it is rotated at this time either by the handle 46 or by power from the feed rod, which is delivered to the gear 29 and pinion 42 when clutch teeth 27 and 28 are engaged by handle 30, the screw 47 operates to move the cross slide in the ordinary way independent of the movement of the carriage 4 in longitudinal feed.

Directly beneath the bracket mounted on a projecting portion 1a of the bed 1 is a base plate 69 arranged to be moved along to adjusted positions along the bed 1 on the surface 70 of the portion 1a. Appropriate T-slot bolts 71 serve to bind the base plate in adjusted positions on the surface 70. Pivotally mounted on a pin 72 fixed in the base plate 69 is the taper bar 73 which may be swivelled in either direction to an angle to the direction of longitudinal travel of the carriage 4, in this particular instance to an angle 74 of approximately 16°. Suitable T slot bolts 75 operating in the arcuate T slots serve to bind the taper bar in adjusted positions.

Between the surfaces 76 and 77 is nicely fitted the truck 78 having appropriate ball bearings 79 on stud 80 in the block which may be nicely adjusted by means of the set screws 81 between these surfaces. The bottom surface 78a of the block 78 slides in contact with the surface 73a of the taper bar 73.

In the block 78 is also formed a bore 82 into which may be snugly entered the plunger 62 by clockwise rotation of the knob 67. In order to facilitate locating the bore 82 for the plunger 62 a V-shaped cutout 82a is formed in the upper surface 78b of the block 78 having its sides 82b and 82c terminating in the bore 82 so that with the plunger 62 extended downward into this cutout 82a movement of the block 50 by appropriate rotation of the screw 47 will automatically bring the plunger 62 in proper register with the bore 82a.

With the plunger 62 engaged in the block 78 and the taper bar set so that the angle 74 is zero degrees, it is that the longitudinal movement of the carriage 4 moving the block 78 along the taper bar 73 will impart no axial movement to the cross feed screw whatever. However, if the bar 73 is set so that the angle 74 is something more than zero degrees the cross feed screw will be axially displaced and will move the cross slide in the same way, the cross feed screw telescoping in the sleeve 43 and while not rotating. Thus in this instance the taper cut will be of precisely the same angle as the setting of the angle 74 so long as the cross feed screw is not rotated during the longitudinal movement of the carriage 4. The range of tapers which may cut with this arrangement is shown by the triangle X—Y—Z. The setting for the taper bar 73 for this range of tapers is indicated in inches per foot in scale 83 in degrees on scale 84 of the index plate 85 fixed on the base 69 by suitable screws 86. An indicating finger 87 fixed on the end of the taper bar 73 provides the means for accurately setting it to the various scales on the plate 85.

In order to provide a still greater range of tapers up to at least 50 degrees the cross feed screw is arranged to be rotated simultaneously with the operation of the longitudinal feeding of the carriage in conjunction with the use of the taper bar 73 as described. In order to do this transmission mechanism is arranged for simultaneously driving the carriage in longitudinal feed and the cross slide in cross feed in such a relationship that their resultant of these motions will cause the tool 5 to cut a fixed taper lying substantially intermediate the maximum taper which may be cut with the taper bar without rotating the cross feed screw and the maximum taper desired to be obtained by the complete apparatus. This transmission mechanism is arranged in this instance to effect a fixed taper of 33 degrees illustrated by the triangle WXV—U—T.

The longitudinal cross feeds are operated simultaneously so that the cross feed screw is rotated to always withdraw the cross slide 6 and the tool 5 away from the axis of the work spindle W, Figure I, while the longitudinal feed may be effected in either one direction of feeding toward the headstock 9 or in the opposite direction of feeding away from the headstock. In order to feed the carriage longitudinally toward the headstock the feed rod 8 is rotated clockwise, Figure I, and the clutch teeth 24 and 25 engaged by raising the lever 30 to effect rotation of the rack pinion 40 as described. Power is delivered at the same time to the cross feed screw 47 from the clutch gear 26 which drives the gear 88 of the double gear 89 journaled on the shaft 10. A shiftable triple gear 90 slidably and rotatably mounted on a shaft 91 fixed in the apron 12 has a gear 92 which may be shifted to the right, Figure I, to engage the gear 93 of the double gear 89, the gear 94 of the triple gear 90 being at the same time shifted into engagement with the clutch gear 29, thus simultaneously driving the cross feed screw to withdraw the cross slide as the carriage feeds toward the headstock. This gearing is so arranged that the carriage feeds along the bed substantially twice as fast as the cross slide withdraws outwardly so as to effect the angle of 33 degrees shown as WXV—U—T in Figure IIa. With the gear 90 so shifted the tapers cut will be of the type shown at A on the index plate 85, Figure I, that is the large end of the taper cut on the work will be toward the headstock.

When tapers like that shown at B on the index plate 85 are to be cut, so that the large end of the taper is toward the tailstock end of the lathe, the triple gear 90 is shifted to the left, Figure I, so that its gear 92 will be directly engaged with the clutch gear 26 and its gear 95 will be engaged with the clutch gear 29. At this time the feed rod 8 is rotated counter clockwise, Figure I, appropriately manipulating the usual feed reverse mechanism in the lathe headstock. Thus, the carriage feeds to the right toward the tailstock end of the lathe while the cross slide withdraws for cutting the B type tapers. Obviously the carriage and cross slide may be operated simultaneously in either direction when set for either A or B type tapers by appropriately reversing the direction of the feed rod 8.

The triple gear 90 may be shifted for A or B type tapers or to a neutral position by means of the taper selection lever 96 carried on the rock shaft 97 journaled in the apron 12. A coarse lead screw 98 is formed on the shaft 97 upon which is mounted a shifter yoke 99 having a suitable projection 100 engaging in the annular slot 101 formed in the gear 90. As the shaft 97 is rocked the yoke 99 travels axially thereof to effect shifting of the gear 90. The index plate 102, Figure IV, associated with the lever 96 shows its position of A or B taper turning and also shows the "Reg." or neutral position when ordinary turning or when taper turning with the taper bar alone is to be undertaken.

It is to be noted that should the feed control lever 30 be moved downwardly when the taper selection lever is in either A or B position no change of operation of the mechanism will result. This is so because the drive to the cross feed screw will be effected from shaft 14, through gear 16, the clutch teeth 27 and 28, and the gears 29 and 42, while the drive to the rack pinion 40 will come from the gear 29, through gears 90 and 89 to the gear 26 and thus through gears 37 and 38 to the pinion 40. Obviously, the interconnecting drive between the gears 26 and 29 through the gears 89 and 90 is the same whether gear 16 is clutched into gear 26 or clutched in gear 29.

When the cross feed and longitudinal feed are operated simultaneously and the taper bar 73 also put into operation by inserting the plunger 62 into the truck 76 any range of tapers between those obtained by the taper bar alone, illustrated as the triangle X—Y—Z in Figure IIa and the maximum of 50 degrees illustrated by triangle QWXVP—R—S may be obtained. Under these conditions the fixed relative movement between the cross slide and carriage 4 as effected by the gearing described is appropriately modified by axially shifting the cross feed screw 47 with the taper bar as described as the cross feed screw is rotating. Thus the cross slide travel may be increased or decreased in speed of travel relative to its fixed rate caused by the rotation of the cross feed screw by appropriately setting the taper bar 73 on the base plate 69. For instance should a taper less than that of 33 degrees be desired the taper bar would be set to move the cross feed screw to the right toward the rear of the lathe, Figure I, while it is rotating in conjunction with the longitudinal movement of the carriage to decrease the relative rate of cross slide travel. Similarly, if a greater angle than the 33 degrees is desired, the taper bar would be set so as to move the cross feed screw to the left toward the front of the lathe to increase the rate of relative cross slide travel.

It is to be noted how simply and quickly the lathe may be arranged for taper turning or ordinary turning. When taper turning is to be undertaken control knob 67 is operated to insert plunger 62 into the truck 76 and the taper selection lever moved to either A or B position. The lathe is quickly changed for ordinary turning by merely moving the taper selection lever to "Reg." position and operating knob 67 to insert the plunger 62 in the bore 68 of the bracket 55. The feed control lever serves to stop and start the tool feed when taper turning and as the usual cross and longitudinal feed selecting lever when ordinary turning is being done.

Having thus fully set forth and described our invention, what we claim and desire to secure by United States Letters Patent is:

1. In a taper turning apparatus for lathe, a bed, a carriage longitudinally movable on said bed, a cross slide mounted for cross travel on said carriage, a cross feed screw for actuating said cross slide, means for simultaneously actuating said carriage and cross feed screw in a predetermined fixed relationship to one another, and means operating in conjunction with the cross feed screw to vary the relative movement of the carriage and cross slide during the simultaneous operation in said predetermined fixed relationship of the carriage and cross feed screw.

2. In a taper turning apparatus for lathe, a bed, a carriage longitudinally movable on said bed, power means for actuating said carriage, a cross slide mounted for cross travel on said carriage, a cross feed screw for operating said cross slide, means for simultaneously connecting said power means to the carriage and said cross feed screw, and means for axially moving said cross feed screw during the simultaneous operation of the carriage and cross slide.

3. In a taper turning apparatus for lathe, a bed, a carriage longitudinally movable on said bed, power means for actuating said carriage, a cross slide mounted for cross travel on said carriage, a cross feed screw for operating said cross slide, means for simultaneously connecting said power means to the carriage and said cross feed screw, and a taper bar carried on said bed and connectable to said cross feed screw for axially moving said cross feed screw during the simultaneous operation of the carriage and cross slide.

4. In a taper turning apparatus for lathe, a bed, a carriage longitudinally movable on said bed, a cross slide actuated by a cross feed screw mounted for cross travel on said carriage, power means for actuating said carriage and cross feed screw, means for connecting said power means to either said carriage or said cross feed screw or to connect said power means to both the carriage and cross feed screw simultaneously, means for holding said cross feed screw against axial movement when said carriage and cross slide are operating independently, and means for effecting axial movement of said cross feed screw when said carriage and cross slide are operating simultaneously.

5. In a taper turning apparatus for lathe, a bed, a carriage longitudinally movable on said bed, an apron on said carriage, a rack on said bed, a rack pinion carried by said apron engaging said rack, a feed rod on said bed driven by the headstock transmission of said lathe, a cross slide mounted for cross travel on said carriage, a cross feed screw journaled in said carriage operating in a nut of said cross slide, means for alternately connecting power from said feed rod to said rack pinion or said cross feed screw, means operating in conjunction with said last mentioned means for simultaneously connecting power from said feed rod to both said rack pinion and said cross feed screw, and means on the bed of said lathe for moving said cross feed screw relative to said carriage during the simultaneous movement of said carriage and cross slide.

6. In a taper turning apparatus for lathe, a bed, a carriage longitudinally movable on said bed, an apron on said carriage, a rack on said bed, a rack pinion carried by said apron engaging said rack, a feed rod on said bed driven by the headstock transmission of said lathe, a cross slide mounted for cross travel on said carriage, a cross feed screw journaled in said carriage operating in a nut of said cross slide, means for alternately connecting power from said feed rod to said rack pinion or said cross feed screw, comprising a series of three coaxially arranged gears in said apron, gearing connecting said feed rod to the middle gear of said series, gearing connecting one of said outside gears to said rack pinion, means connecting the other outside gear to said cross feed screw, means for axially sliding said middle gear to clutch it in engagement with one or the other of said outside gears, and gearing interconnecting said outside gears.

7. In a taper turning apparatus for lathe, a bed, a carriage longitudinally movable on said bed, an apron on said carriage, a rack on said bed, a rack pinion carried by said apron engaging said rack, a feed rod on said bed driven by the headstock transmission of said lathe, a cross slide mounted for cross travel on said carriage, a cross feed screw journaled in said carriage operating in a nut of said cross slide, means for alternately connecting power from said feed rod to said rack pinion or said cross feed screw, comprising a series of three coaxially arranged gears in said apron, gearing connecting said feed rod to the middle gear of said series, gearing connecting one of said outside gears to said rack pinion, means connecting the other outside gear to said cross feed screw, means for axially sliding said middle gear to clutch it in engagement with one or the other of said outside gears, and gearing arranged to connect or disconnect said outside gears for rotation in the same or opposite directions.

8. In a taper turning apparatus for lathe, a bed, a carriage longitudinally movable on said bed, an apron on said carriage, a rack on said bed, a rack pinion carried by said apron engaging said rack, a feed rod on said bed driven by the headstock transmission of said lathe, a cross slide mounted for cross travel on said carriage, a cross feed screw journaled in said carriage operating in a nut of said cross slide, means for alternately connecting power from said feed rod to said rack pinion or said cross feed screw, comprising a series of three coaxially arranged gears in said apron, gearing connecting said feed rod to the middle gear of said series, gearing connecting one of said outside gears to said rack pinion, means connecting the other outside gear to said cross feed screw, means for axially sliding said middle gear to clutch it in engagement with one or the other of said outside gears, gearing arranged to connect or disconnect said outside gears for rotation in the same or opposite directions, and operable by the longitudinal movement of said carriage to cause relative axial movement of said cross feed screw to effect movement of said cross slide independent of the movement effected by said feed rod.

9. In a lathe, a bed, a carriage slidably mounted on said bed for longitudinal movement thereof, a cross slide slidably mounted on said carriage, a cross feed screw in said carriage for effecting cross travel in said cross slide, an apron mounted on said carriage, a feed rod arranged longitudinally of said bed, a shaft in said apron, bevel gearing between said shaft and feed rod whereby said shaft is driven by said feed rod, a series of three coaxially rotatably mounted gears in said apron, a pinion on said shaft adapted to drive the middle gear of said series, gearing connecting one of the outside gears to said cross feed screw, gearing connecting the other of said outside gears to a rack pinion carried by said apron engaging a rack on said bed, a second shaft, a compound gear carried by said second shaft having one of its gears engaging one of the outside gears and the other of its gears engaging the other of said outside gears, and means for axially shifting said middle gear to alternately connect it in driving relation between one or the other of said outside gears.

10. In a lathe, a bed, a carriage slidably mounted on said bed for longitudinal movement thereof, a cross slide slidably mounted on said carriage, a cross feed screw in said carriage for effecting cross travel in said cross slide, an apron mounted on said carriage, a feed rod arranged longitudinally of said bed, a shaft in said apron, bevel gearing between said shaft and feed rod whereby said shaft is driven by said feed rod, a series of three coaxially rotatably mounted gears in said apron, a pinion on said shaft adapted to drive the middle gear of said series, gearing connecting one of the outside gears to said cross feed screw, gearing connecting the other of said outside gears to a rack pinion carried by said apron engaging a rack on said bed, a gear rotatably mounted on said shaft in engagement with one of said outside gears, a second shaft, a compound gear carried by said second shaft having one of its gears engaging said gear on said shaft and its other gear engaging the other of said outside gears, and means for axially shifting said middle gear to alternately connect it in driving relation between one or the other of said outside gears.

11. In a lathe, a bed, a carriage slidably mounted on said bed for longitudinal movement thereof, a cross slide slidably mounted on said carriage, a cross feed screw in said carriage for effecting cross travel in said cross slide, an apron mounted on said carriage, a feed rod arranged longitudinally of said bed, a shaft in said apron, bevel gearing between said shaft and feed rod whereby said shaft is driven by said feed rod, a series of three coaxially rotatably mounted gears in said apron, a pinion on said shaft adapted to drive the middle gear of said series, gearing connecting one of the outside gears to said cross feed screw, gearing connecting the other of said outside gears to a rack pinion carried by said apron engaging a rack on said bed, a compound gear rotatably mounted on said shaft having one of its gears in engagement with one of said outside gears, a second shaft, a second compound gear carried by said second shaft having one of its gears engaging the other gear of said first mentioned compound gear and having its other gear engaging the other of said outside gears, and means for axially shifting said middle gear to alternately connect it in driving relation between one or the other of said outside gears.

12. In a lathe, a bed, a carriage slidably mounted on said bed for longitudinal movement thereof, a cross slide slidably mounted on said carriage, a cross feed screw in said carriage for effecting cross travel in said cross slide, an apron mounted on said carriage, a feed rod arranged longitudinally of said bed, a shaft in said apron, bevel gearing between said shaft and feed rod whereby said shaft is driven by said feed rod, a series of three coaxially rotatably mounted gears in said apron, a pinion on said shaft adapted to drive the middle gear of said series, gearing connecting one of the outside gears to said cross feed screw, gearing connecting the other of said outside gears to a rack pinion carried by said apron engaging a rack on said bed, a compound gear rotatably mounted on said shaft having one of its gears in engagement with one of said outside gears, a second shaft, a triple gear carried by said second shaft arranged so that one of its outer gears may be the outside gear connected to the cross feed screw while its other outer gear is engaged with the other gear of said compound gear rotatably mounted on said shaft, said middle gear of said triple gear being arranged to engage said outside gear connected to the cross feed screw while one of its outer gears engages the outside gear connected to the rack pinion, and means for axially shifting said middle gear to alternately connect it in driving relation between one or the other of said outside gears.

13. In a lathe, a bed, a carriage slidably mounted on said bed for longitudinal movement thereof, a cross slide slidabaly mounted on said carriage, a cross feed screw in said carriage for effecting cross travel in said cross slide, an apron mounted on said carriage, a feed rod arranged longitudinally of said bed, a shaft in said apron, bevel gearing between said shaft and feed rod whereby said shaft is driven by said feed rod, a series of three coaxially rotatably mounted gears in said apron, a pinion on said shaft adapted to drive the middle gear of said series, gearing connecting one of the outside gears to said cross feed screw, gearing connecting the other of said outside gears to a rack pinion carried by said apron engaging a rack on said bed, a compound gear rotatably mounted on said shaft having one of its gears in engagement with one of said outside gears, a second shaft, a triple gear carried by said second shaft arranged so that one of its outer gears may be the outside gear connected to the cross feed screw while its other outer gear is engaged with the other gear of said compound gear rotatably mounted on said shaft, said middle gear of said triple gear being arranged to engage said outside gear connected to the cross feed screw while one of its outer gears engages the outside gear connected to the rack pinion, control means on the front of said apron for shifting said triple gear to effect said gear engagements or to shift said triple gear to a neutral position, and control means on the front of said apron for axially shifting said middle gear to alternately connect it in driving relation between one or the other of said outside gears.

14. In a taper turning apparatus for lathe, a bed, a carriage movable longitudinally of said bed, a cross slide mounted for cross travel on said carriage, a block slidably mounted in said carriage, a cross feed screw journaled against axial movement in said block whereby movement of said block causes axial movement of said screw, a taper bar carried on said bed, a truck adapted to operate in said taper bar and a connecting device for alternately fixing said block to said carriage or connecting said block to said truck.

15. In a lathe, a bed, a carriage slidably mounted on said bed for longitudinal movement thereof, a cross slide slidably mounted on said carriage, a cross feed screw in said carriage for effecting cross travel in said cross slide, an apron mounted on said carriage, a feed rod arranged longitudinally of said bed, a shaft in said apron, bevel gearing between said shaft and feed rod whereby said shaft is driven by said feed rod, a series of three coaxially rotatably mounted gears in said apron, a pinion on said shaft adapted to drive the middle gear of said series, gearing connecting one of the outside gears to said cross feed screw, gearing connecting the other of said outside gears to a rack pinion carried by said apron engaging a rack on said bed, a compound gear rotatably mounted on said shaft having one of its gears in engagement with one of said outside gears, a second shaft, a triple gear carried by said second shaft arranged so that one of its outer gears may be the outside gear connected to the cross feed screw while its other outer gear is engaged with the other gear of said compound gear rotatably mounted on said shaft, said middle gear of said triple gear being arranged to engage said outside gear connected to the cross feed screw while one of its outer gears engages the outside gear connected to the rack pinion, control means on the front of said apron for shifting said triple gear to effect said gear engagements or to shift said triple gear to a neutral position, control means on the front of said apron for axially shifting said middle gear to alternately connect it in driving relation between one or the other of said outside gears, a block slidably mounted in said carriage, means for journaling said cross feed screw against axial movement in said block, whereby movement of said block causes axial movement of said screw, a taper bar carried on said bed, a truck adapted to operate in said taper bar, and a connecting device for alternately fixing said block to said carriage or connecting said block to said truck.

WILLIAM F. GROENE.
HARRY C. KEMPER.